US011205254B2

(12) United States Patent
Monkarsh

(10) Patent No.: US 11,205,254 B2
(45) Date of Patent: Dec. 21, 2021

(54) SYSTEM AND METHOD FOR IDENTIFYING AND OBSCURING OBJECTIONABLE CONTENT

(71) Applicant: PXLIZE, LLC, West Hollywood, CA (US)

(72) Inventor: Josh Monkarsh, West Hollywood, CA (US)

(73) Assignee: PXLIZE, LLC, West Hollywood, CA (US)

( * ) Notice: Subject to any disclaimer, the term of this patent is extended or adjusted under 35 U.S.C. 154(b) by 42 days.

(21) Appl. No.: 15/691,571

(22) Filed: Aug. 30, 2017

(65) Prior Publication Data

US 2019/0066279 A1 Feb. 28, 2019

(51) Int. Cl.
*G06T 7/00* (2017.01)
*G06T 5/10* (2006.01)
*H04L 29/08* (2006.01)

(52) U.S. Cl.
CPC .............. *G06T 5/10* (2013.01); *G06T 7/0002* (2013.01); *H04L 67/306* (2013.01); *G06T 2207/20024* (2013.01)

(58) Field of Classification Search
CPC ........... H04N 21/4542; H04N 21/4318; H04N 21/4532; H04N 21/4126; H04N 5/913; G06T 2207/20024; G06T 5/10; G06T 7/0002; H04L 67/306
See application file for complete search history.

(56) References Cited

U.S. PATENT DOCUMENTS

| | | |
|---|---|---|
| 7,805,680 B2 | 9/2010 | Meyers et al. |
| 8,041,190 B2 | 10/2011 | Candelore et al. |
| 8,826,322 B2 | 9/2014 | Bliss et al. |
| 8,831,953 B2 | 9/2014 | Vanjani |
| 8,856,820 B2 | 10/2014 | Chung et al. |
| 8,875,257 B1 | 10/2014 | Wurtenberger et al. |
| 8,893,169 B2 | 11/2014 | Klappert et al. |
| 8,949,878 B2 | 2/2015 | Dimitrova et al. |
| 9,015,571 B2 | 4/2015 | Jarman et al. |
| 9,071,871 B2 | 6/2015 | Porter et al. |
| 9,213,986 B1 | 12/2015 | Buchheit et al. |

(Continued)

FOREIGN PATENT DOCUMENTS

WO WO-2017103004 A1 * 6/2017 ......... G02B 27/0172

OTHER PUBLICATIONS

International Search Report and Written Opinion issued in corresponding PCT Application No. PCT/US2018/045418, dated Oct. 16, 2018, 12 pages.

*Primary Examiner* — Kenny A Cese
(74) *Attorney, Agent, or Firm* — Lewis Roca Rothgerber Christie, LLP

(57) ABSTRACT

A system for obscuring portions of multimedia content, includes: a processor; and memory coupled to the processor, wherein the memory has stored thereon instructions that, when executed by the processor, causes the processor to: identify obscuring preferences from a user profile; determine one or more objectionable content types from the obscuring preferences; retrieve one or more filter files corresponding to the objectionable content types, each of the filter files including at least one filter image corresponding to a portion of a frame; and transmit the filter image to obscure the portion of the frame.

18 Claims, 13 Drawing Sheets

(56) References Cited

U.S. PATENT DOCUMENTS

| | | | |
|---|---|---|---|
| 9,247,296 B2 | 1/2016 | Botta et al. | |
| 9,363,561 B1 | 6/2016 | Harmon et al. | |
| 9,401,943 B2 | 7/2016 | LaVoie et al. | |
| 9,471,852 B1* | 10/2016 | Feris | G06F 16/435 |
| 10,122,825 B1* | 11/2018 | Petty | H04L 67/2828 |
| 2002/0147782 A1* | 10/2002 | Dimitrova | H04N 21/4542 709/207 |
| 2004/0006767 A1 | 1/2004 | Robson et al. | |
| 2009/0049467 A1 | 2/2009 | Robson et al. | |
| 2011/0161999 A1* | 6/2011 | Klappert | H04N 21/4755 725/25 |
| 2011/0219039 A1 | 8/2011 | Xu et al. | |
| 2013/0117464 A1 | 5/2013 | Brown et al. | |
| 2014/0003789 A1 | 1/2014 | Konduru | |
| 2014/0150009 A1 | 5/2014 | Sharma | |
| 2015/0067717 A1* | 3/2015 | Oliver | H04N 21/4542 725/28 |
| 2015/0070516 A1* | 3/2015 | Shoemake | H04N 21/4223 348/207.11 |
| 2015/0100977 A1 | 4/2015 | Shieh et al. | |
| 2015/0371611 A1 | 12/2015 | Raley et al. | |
| 2016/0037217 A1* | 2/2016 | Harmon | H04N 21/4756 725/9 |
| 2016/0057497 A1 | 2/2016 | Kim et al. | |
| 2016/0093316 A1 | 3/2016 | Paquier et al. | |
| 2016/0099787 A1 | 4/2016 | Jackson | |
| 2016/0173429 A1 | 6/2016 | Krug et al. | |
| 2018/0341877 A1* | 11/2018 | Panattoni | G06Q 50/01 |
| 2018/0376204 A1* | 12/2018 | Oswal | G02B 27/0172 |

\* cited by examiner

SYSTEM AND METHOD FOR IDENTIFYING AND OBSCURING OBJECTIONABLE CONTENT

BACKGROUND

1. Field

One or more example embodiments of the present invention relate to a system and method for identifying objectionable content.

One or more example embodiments of the present invention relate to a system and method for obscuring objectionable content.

2. Description of the Related Art

Multimedia content may be played on a media player of a computing device, such as a desktop computer, a laptop, a smart phone, an mp3 player, and the like. The multimedia content may be stored on a storage device connected to or accessible by the computing device in the form of a multimedia file, and may be downloaded or streamed on the computing device. As a result of an increase in the number of streaming and/or downloading services for multimedia content, accessibility to multimedia content has increased.

While existing rating systems categorize a particular program as being suitable for a particular age group, these age based categories are often based on beliefs and standards that may apply to some, but not all members of the age group. Further, some rating systems may provide a general indication of the types of content that may be encountered in a particular program, but the majority of the program may contain content that is not objectionable. In addition, some programs may contain content that is generally considered as not being objectionable to most viewers, but may be considered to be objectionable to some viewers.

The above information disclosed in this Background section is for enhancement of understanding of the background of the invention, and therefore, it may contain information that does not constitute prior art.

SUMMARY

In one aspect of the present disclosure, a system for obscuring portions of multimedia content is provided. The system includes a processor and memory coupled to the processor, wherein the memory has stored thereon instructions that, when executed by the processor, causes the processor to identify obscuring preferences from a user profile, determine one or more objectionable content types from the obscuring preferences, retrieve one or more filter files corresponding to the objectionable content types, each of the filter files comprising at least one filter image corresponding to a portion of a frame, and transmit the filter image to obscure the portion of the frame.

In one embodiment, the system includes generating a mask file from the one or more filter files, the mask file comprising a plurality of frames corresponding to a plurality of frames of a source video.

In one embodiment, the mask file is a video file.

In one embodiment, the mask file is a vector file.

In one embodiment, the mask file comprises a plurality of filter images, but does not include image data of the plurality of frames of the source video.

In one embodiment, the plurality of filter images are in a different color for each of the objectionable content types.

In one embodiment, the different colors identify different ones of the objectionable content types in the mask file.

In one embodiment, the system further includes a first user device and a second user device communicatively connected to the first user device, wherein the first user device is configured to generate the filter image, and the second user device is configured to utilize the filter image to obscure the portion of the frame.

In one embodiment, the first user device is configured to invoke a tag mode to generate the filter image, and the second user device is configured to obscure a portion of a display of the second user device in response to the invoking of the tag mode on the first user device.

In one embodiment, the first user device is configured to display the frame unobscured, and the second user device is configured to display the frame with the portion of the frame being obscured.

In another aspect of the present disclosure, a method for obscuring portions of multimedia content is provided. The method includes identifying, by a processor, obscuring preferences from a user profile, determining, by the processor, one or more objectionable content types from the obscuring preferences, retrieving, by the processor, one or more filter files corresponding to the objectionable content types, each of the filter files comprising at least one filter image corresponding to a portion of a frame, and transmitting, by the processor, the filter image to obscure the portion of the frame.

In one embodiment, the method further includes generating, by the processor, a mask file from the one or more filter files, the mask file comprising a plurality of frames corresponding to a plurality of frames of a source video.

In one embodiment, the mask file is a video file.

In one embodiment, the mask file is a vector file.

In one embodiment, the mask file comprises a plurality of filter images, but does not include image data of the plurality of frames of the source video.

In one embodiment, the plurality of filter images are in a different color for each of the objectionable content types.

In one embodiment, the different colors identify different ones of the objectionable content types in the mask file.

In one embodiment, the method further includes a first user device, and a second user device communicatively connected to the first user device, wherein the first user device is configured to generate the filter image, and the second user device is configured to utilize the filter image to obscure the portion of the frame.

In one embodiment, the first user device is configured to invoke a tag mode to generate the filter image, and the second user device is configured to obscure a portion of a display of the second user device in response to the invoking of the tag mode on the first user device.

In one embodiment, the first user device is configured to display the frame unobscured, and the second user device is configured to display the frame with the portion of the frame being obscured.

BRIEF DESCRIPTION OF THE DRAWINGS

The above and other aspects and features of the present invention will become apparent to those skilled in the art from the following detailed description of the example embodiments with reference to the accompanying drawings.

DETAILED DESCRIPTION

Figure 1A:
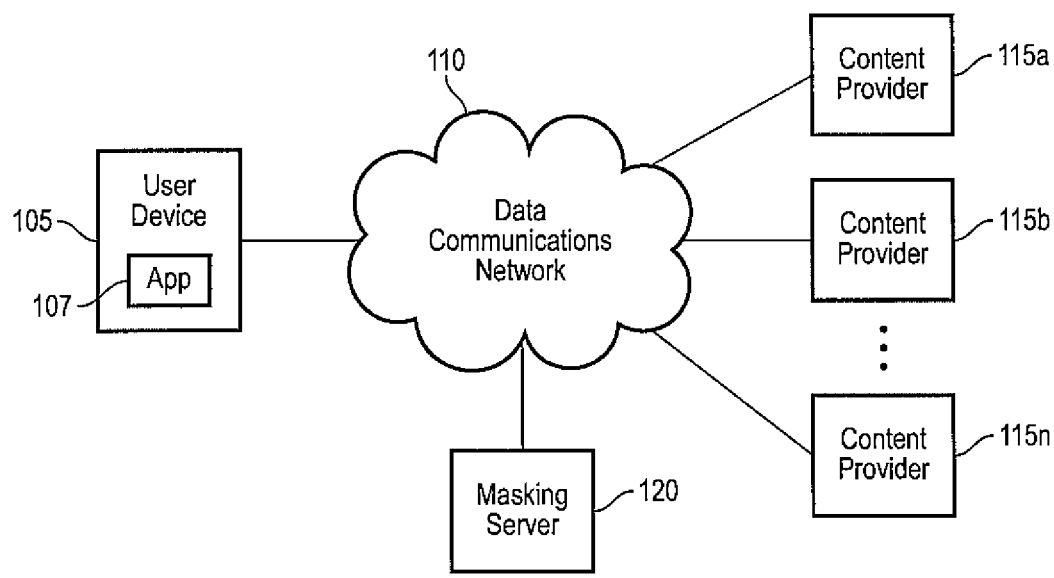
FIG. 1A is a schematic block diagram of a system for identifying and obscuring objectionable content, according to one or more embodiments of the present invention.

Hereinafter, example embodiments will be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively.

According to one or more embodiments of the present invention, a user may selectively filter portions of a multimedia file that the user considers to be objectionable. Objectionable or objectionable content as used in this specification refers to any content that the particular user finds objectionable, regardless of societal norms. For example, while most users may not consider content with fire to be objectionable, a user with post-traumatic stress disorder (PTSD) caused by some experience with fire may consider any images of fire as objectionable content. Accordingly, such a user may wish to obscure any images that depict fire, regardless of whether other users consider fire to be objectionable content. As another example, while most users may not consider the words "stupid" or "dumb" as being objectionable, some parents may decide that these words are unsuitable for their minor children. Accordingly, such users may wish to obscure portions of audio containing these words.

According to one or more embodiments of the present invention, images of objectionable content may be obscured via various effects. For example, the objectionable portion of the image may be pixilated, blurred, blocked via visual overlays, removed entirely, skipped, and/or even changed by using computer generated imagery (CGI) to add clothes to a nude actor, for example. However, the present invention is not limited thereto, and the objectionable image may be obscured using any suitable effect or method.

According to one or more embodiments of the present invention, audio of objectionable content may be obscured via various effects. For example, the objectionable portion of the audio may be muted, bleeped, replaced with less offensive words, reversed, removed, skipped, and/or the like. However, the present invention is not limited thereto, and the objectionable audio may be obscured using any suitable effect or method.

According to an example embodiment, a video or vector file may be used to represent tagged regions in a source video to identify the objectionable portions in the source video. For example, the regions of the source video representing the objectionable portions, and how those regions move over time, may be represented in the video or vector file. According to an example embodiment, computer vision and/or human curation may be used to generate the video or vector files for the source videos.

According to an example embodiment, a user of a first device (e.g., a primary device) may control the media content that is played on a second device (e.g., a secondary device). In one embodiment, an unobscured version of the media content may be played on the first device concurrently (or simultaneously) with an obscured version of the media content played on the second device. In one embodiment, the first device may control content obscuring on the second device.

Figure 1B:
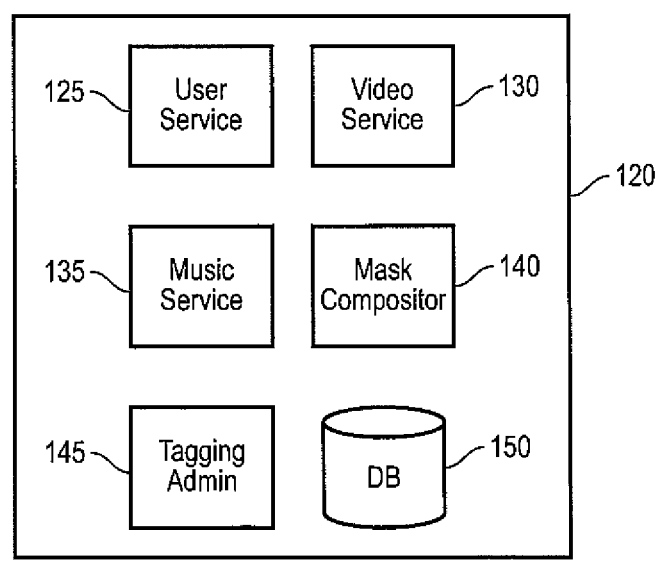
FIG. 1B is a schematic block diagram of the masking server shown in FIG. 1A in more detail.

FIG. 1A is a schematic block diagram of a system for identifying and obscuring objectionable content, according to one or more embodiments of the present invention. FIG. 1B is a schematic block diagram of the masking server shown in FIG. 1A in more detail.

Referring to FIGS. 1A and 1B, a user device 105 may have an application 107 installed thereon. The user device 105 may be any suitable device including, for example, a television, a projector, a smart phone, a tablet, a laptop, a personal computer, a streaming stick, a streaming device, a video game console, and/or the like. The streaming stick and/or streaming device may include, for example, Amazon Fire TV, Amazon Fire TV Stick with Alexa Voice Remote, Google Chromecast Audio, Roku Premiere+, Roku Streaming Stick, Google Chromecast, Google Chromecast Ultra, Nvidia Shield TV, Apple TV, and the like. The video game console may include, for example, Microsoft Xbox One S, Sony PlayStation 4 Slim, Nintendo Switch, Sony PlayStation 4 Pro, NVIDIA SHIELD TV Pro, Nintendo 3DS XL, Microsoft Xbox 360, Hyperkin RetroN 5, and the like.

The application 107 may include a media player for playing multimedia content, and a graphical user interface (GUI) for marking objectionable portions of the multimedia content to generate filter files. However, the present invention is not limited thereto, for example, the application 107 may be available as a software development kit (SDK) that may be embedded in other applications for marking or obscuring content (e.g., objectionable content) in the other applications.

The device 105 may be commutatively connected to a cellular or data communications network 110. For example, the communications network 110 may include a local area network (LAN), private wide area network (WAN), public wide area network, such as the Internet, a wireless carrier network including, for example, a code division multiple access (CDMA) network or a global system for mobile communications (GSM) network, and/or any suitable wireless network/technology including but not limited to, for example, 3G, 4G, LTE, and the like.

The application 107 may access multimedia content stored in a local data storage device, in Cloud storage, and/or in one or more data stores associated with one or more content providers 115a-115n. The one or more content providers may include, for example, YouTube, Hulu, Netflix, HBO GO, Itunes, Apple App Store, Samsung Galaxy Apps, Smart Hub, Google Play, Amazon Instant Video, VUDU, Crackle, PLEX, HBO NOW, EPIX, SHOWTIME, Cinema Now, Kodi, Sling TV, and the like.

The application 107 may stream multimedia content from the one or more content providers and/or may play multimedia content that is stored locally or in the Cloud. The multimedia file may include, for example, a video file, an image file, and/or an audio file. Hereinafter, for convenience of description, it is described that the multimedia file is a video file (e.g., a source video file), but the present invention is not limited thereto.

The application 107 may be communicatively connected to a masking server 120. The application 107 may request mask files from the masking server 120, and may generate and send filter files to the masking server 120. Further, the filter files and/or mask files may be stored locally on the user device 105 for offline viewing.

In more detail, the masking server 120 may include a user service 125, a video service 130, a mask service 135, a mask compositor 140, a tagging admin 145, and one or more data storage devices 150. While FIG. 1B illustrates that each of the user service 125, the video service 130, the mask service 135, the mask compositor 140, and the tagging admin 145 are located in the same masking server 120, the present invention is not limited thereto. For example, each of the user service 125, the video service 130, the mask service 135, the mask compositor 140, and the tagging admin 145 may be included on the same server or may be included on separate servers, each having a processor and memory for storing instructions that are executable by the processor. Further, each of the user service 125, the video service 130, the mask service 135, the mask compositor 140, and the tagging admin 145 may be included on one or more servers in the Cloud. The various components of the masking server 120 may also be distributed across various geographic locations and computing environments, and may not be necessarily contained in a single location, computing environment, or even computing device.

The user service 125 may store a user profile including user profile settings for each user. Upon login, the application 107 may fetch the user profile settings from the user service 125. The user profile may include information about the user (e.g., name, age, email address, etc.), as well the user profile settings to determine obscuring preferences of the user. For example, the obscuring preferences may indicate the types of content that the user finds objectionable (e.g., nudity, sex, violence, blood, gore, drugs and drug use, etc.), and may be used by the masking server 120 to generate a mask file based on the types of objectionable content indicated by the obscuring preferences.

The video service 130 may store tags (or flags) corresponding to timecodes for a source video. The tags may indicate that the source video contains some type of objectionable content at a particular frame corresponding to the timecode of the source video. For example, the tags may indicate that a frame corresponding to a particular timecode of the source video contains nudity content. When the user watches a video, for example, the application 107 may fetch a list of the tags for the video, and may determine corresponding ones of the tags according to the obscuring preferences for the user.

The mask service 135 stores filter files for the source video. The filter files may be a video file or a vector file containing filter images corresponding to the objectionable content in the source video. For example, the filter images may correspond to (e.g., overlap with) one or more portions of the image of the frame that contain objectionable content. According to an embodiment of the present invention, the filter files may contain the filter images for a corresponding frame of the source video, but may exclude the image (e.g., image data) for the corresponding frame of the source video. Accordingly, the filter files may be smaller or substantially smaller in size (e.g., data size or file size) than that of the source video file.

According to an embodiment of the present invention, one or more filter files may be stored for each objectionable content type contained in the source video. For example, if the source video contains nudity and violent content, one or more filter files may be stored for the nudity content and one or more filter files may be stored for the violent content. Accordingly, the mask service 135 may store one or more filter files for each objectionable content type that is identified in a corresponding source video. Further, in one embodiment, the filter files and/or mask files may be stored locally on the user device 105 for offline viewing.

According to an embodiment of the present invention, the filter images may be in a different color for each objectionable content type. For example, filter images corresponding to violent content may be red in color, while filter images corresponding to nudity content may be blue in color. Accordingly, when a mask file is generated containing a combination of filter images for various objectionable content types, the type of objectionable content contained in the mask file may be identified according to a color of the filter images in the mask file. In one embodiment, the objectionable content may be obscured differently depending on the objectionable content type as identified by the color of the filter image. For example, nudity content may be obscured by adding clothes to a nude actor, whereas violent content may be obscured via pixilation.

According to an embodiment of the present invention, the application 107 may request the filter files corresponding to the tags from the video service 130 based on the obscuring preferences of the user. In some embodiments, the mask service 135 may provide the filter files directly to the application 107 to be used for obscuring the objectionable content in the source video. In some embodiments, the mask service 135 may provide the filter files to the mask compositor 140 to generate the mask file by combining or merging (e.g., overlapping) the filter files, and the mask service 135 or the mask compositor 140 may provide the mask file to the application 107 to be used for obscuring the objectionable content in the source video. In this case, the mask file contains all the filter images for each of the objectionable content types according to the obscuring preferences of the user. In some embodiments, the filter files may be user generated. In some embodiments, the filter files may be automatically generated using object detection and computer vision algorithms, as well as machine learning and/or human curation to fine tune the computer vision algorithms.

The tagging admin 145 may facilitate tagging and marking of objectionable content in the source video. For example, when the application 107 is in a tag mode, the user may mark objectionable portions of the source video and/or generate tags to identify the frames containing objectionable content in the source video. When the user tags the objectionable portions, the tags identify the frames of the source video having objectionable content. When the user marks objectionable portions of the source video, the user generates filter files by selecting regions of the frame having the objectionable content.

In some embodiments, the tagging admin 146 may facilitate crowd-sourced tagging and filter file generation by a plurality of users, to be used by any one of the plurality of users for obscuring objectionable content. For example, when one user marks or tags objectionable content in a particular source video, the generated tags and/or filter files by the one user is stored, so that another user may use the generated tags and/or filter files to obscure the objectionable content when viewing the particular source video.

Figure 2A:
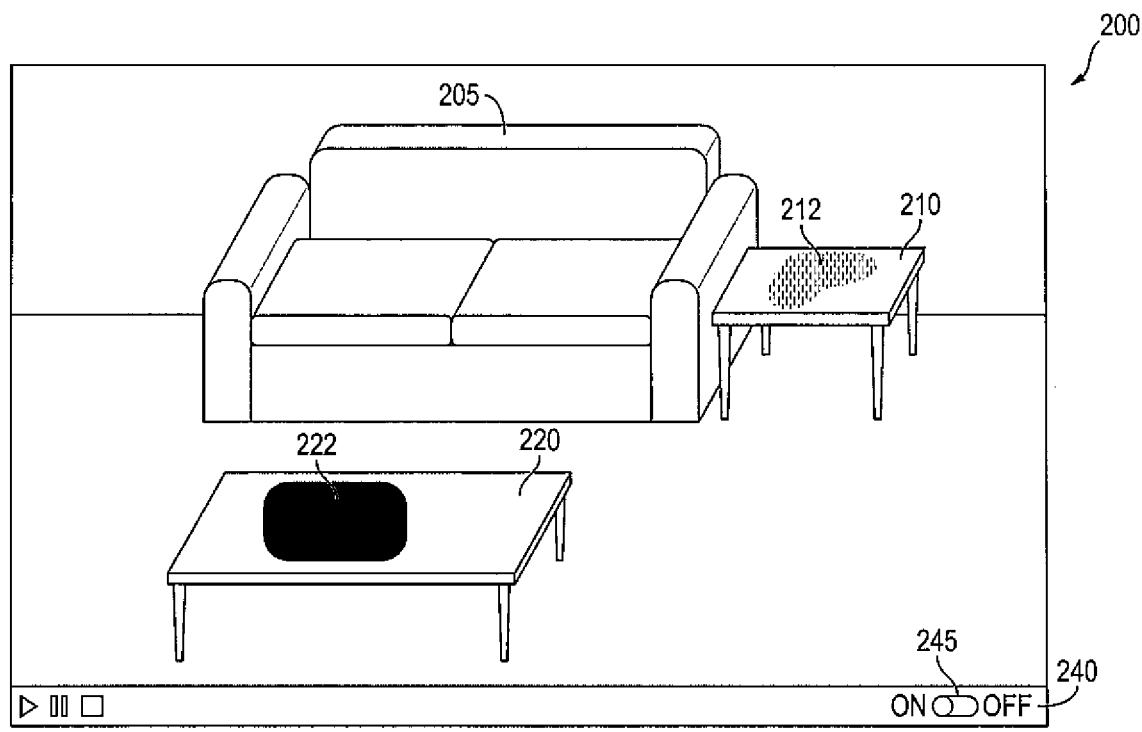
FIG. 2A illustrates a frame of a source video displayed on a user device with portions of an image corresponding to the frame obscured.
Figure 2B:
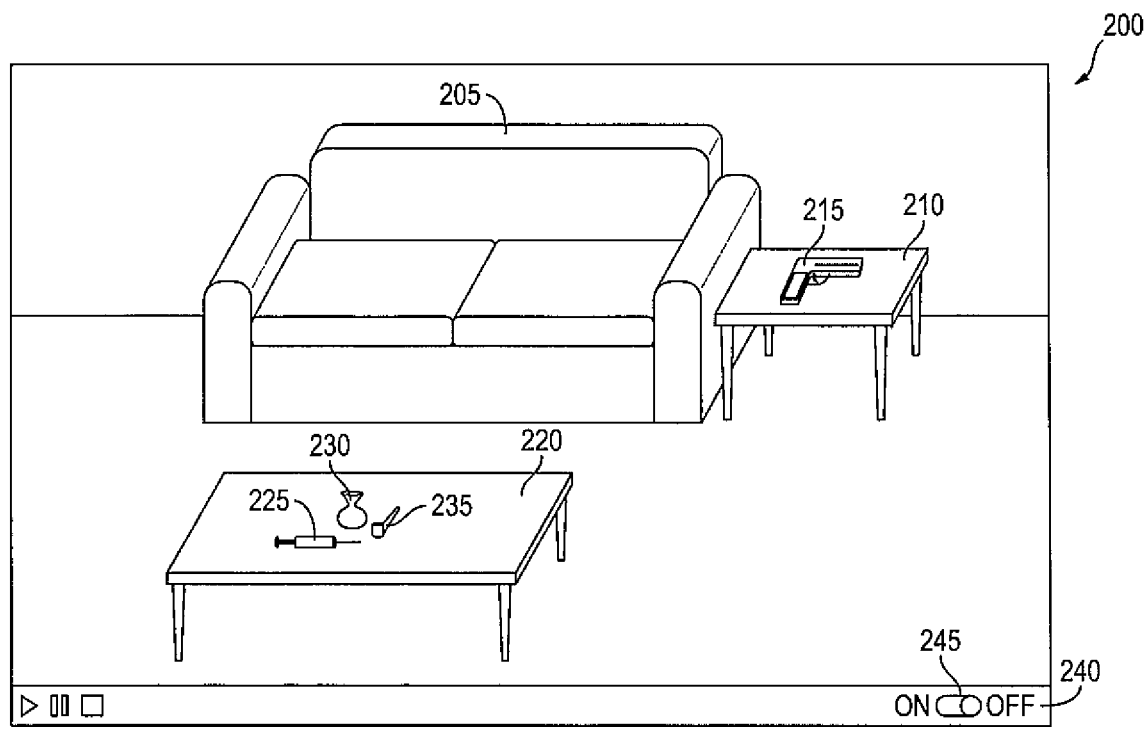
FIG. 2B illustrates the original image for the frame in FIG. 2A displayed on the user device.
Figure 2C:
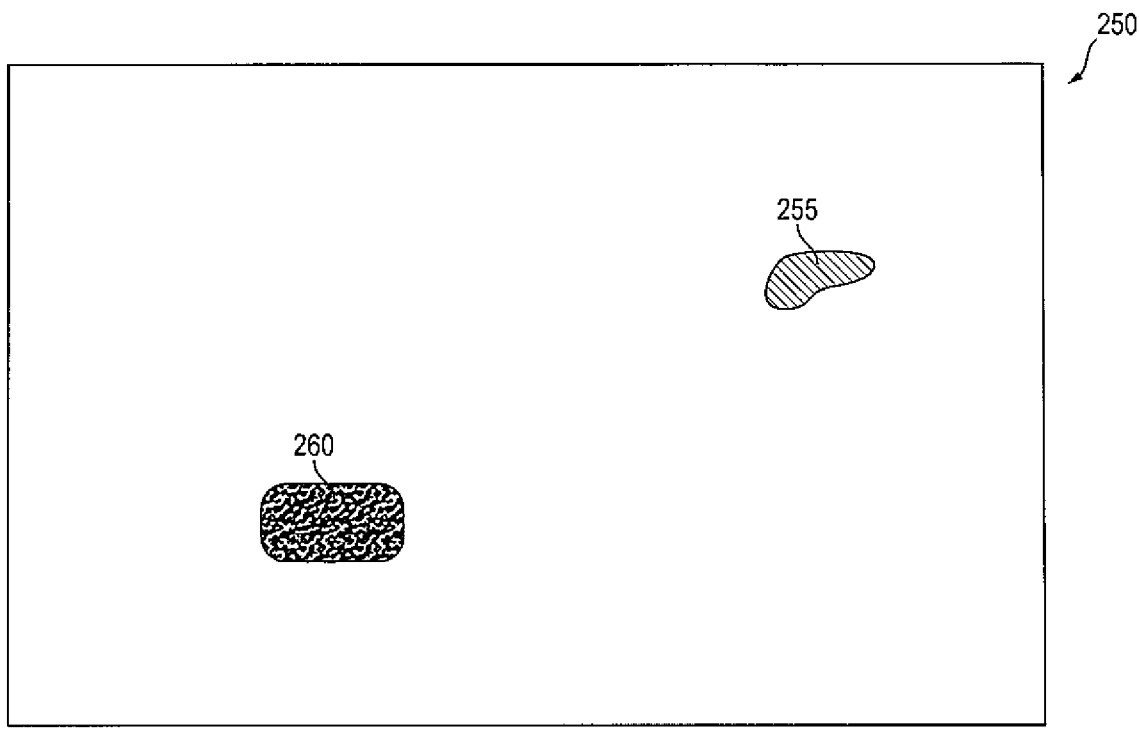
FIG. 2C illustrates a frame of a mask file used to obscure the portions of the image in FIG. 2A.
Figure 2D:
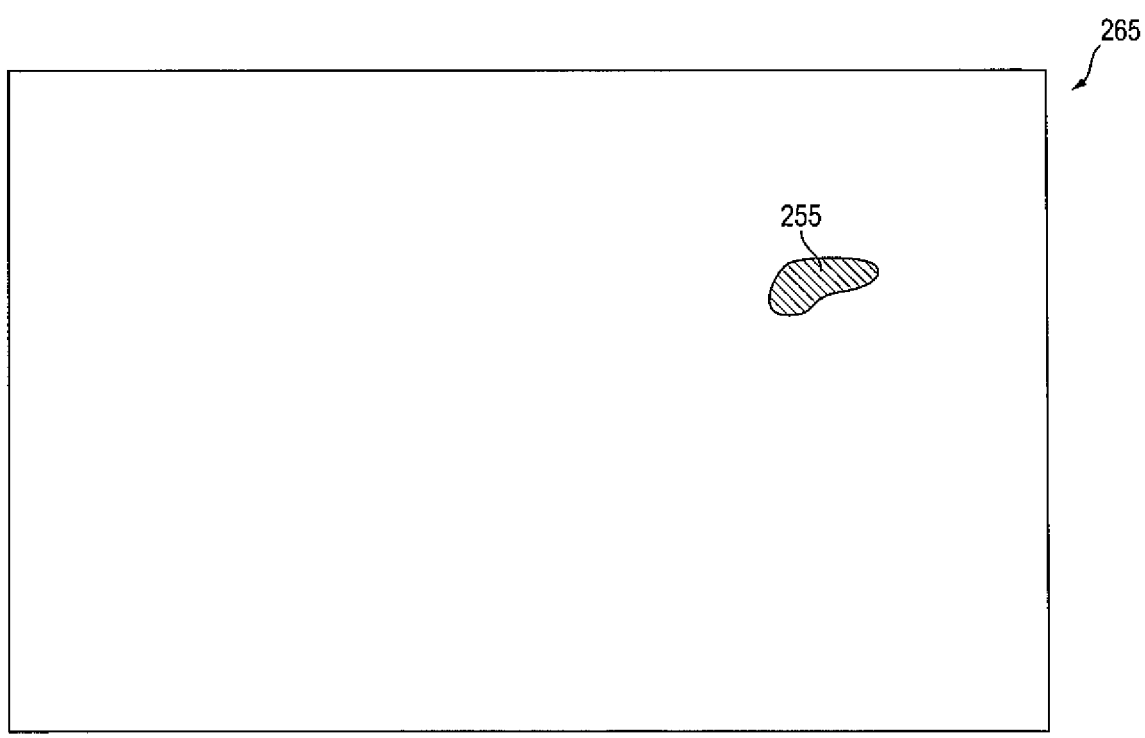
FIG. 2D illustrates a filter image of a first filter file used to generate the mask file of FIG. 2C.
Figure 2E:
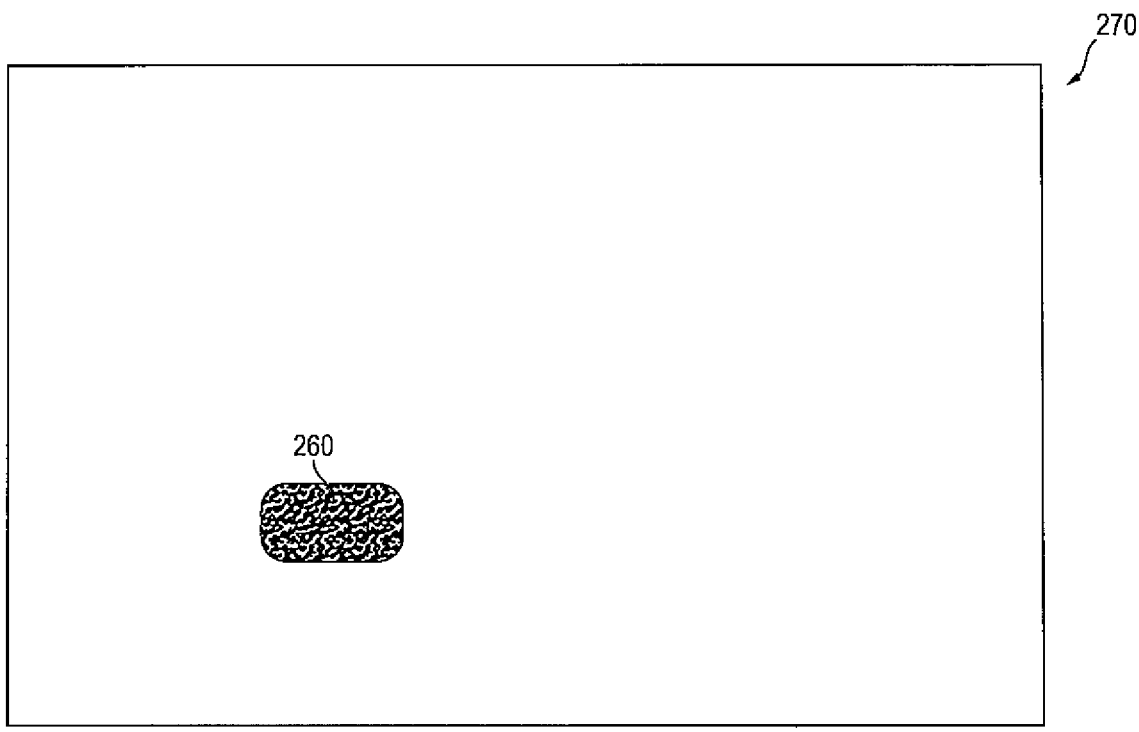
FIG. 2E illustrate a filter image of a second filter file used to generate the mask file of FIG. 2C.

FIG. 2A illustrates a frame of a source video displayed on a user device with portions of an image corresponding to the frame being obscured. FIG. 2B illustrates the original image for the frame in FIG. 2A displayed on the user device. FIG. 2C illustrates a frame of a mask file used to obscure the portions of the image in FIG. 2A. FIG. 2D illustrates a filter image of a first filter file used to generate the mask file of FIG. 2C. FIG. 2E illustrate a filter image of a second filter file used to generate the mask file of FIG. 2C. In FIGS. 2A through 2E, it is assumed that the user profile indicates that violence (e.g., gun play) and drug/drug use are the types of content that should be obscured.

Referring to FIGS. 2A and 2B, the frame of the source video depicts an image 200 of a scene from a frame in the source video. The image 200 includes a sofa 205 and a side table 210 next to the sofa 205. On the side table 210 is a gun 215 that has been obscured by a first mask 212. The image 200 further includes a coffee table 220 in front of the sofa 205. On the coffee table 220 is a syringe 225, a bag of drugs 230, and a pipe 235 next to the bag of drugs 230, which have been obscured by a second mask 222.

According to some embodiments, the media player of the application 107 for displaying the source video may include a control bar 240 to control the media player. The control bar 240 may include a switch 245 for controlling the display of the image 200. For example, when the switch is in the on position (e.g., as shown in FIG. 2A), the image 200 is displayed with the objectionable portions of the image 200 being obscured via the first and second masks 212 and 222. When the switch is in the off position (e.g., as shown in FIG. 2B), the image 200 is displayed in its original form without the first and second masks 212 and 222 obscuring the objectionable portions thereof. In some embodiments, the user may be prompted to enter a security code (e.g., a password) in order to toggle the switch 245 in the on/off positions.

Referring to FIGS. 2C through 2E, a corresponding frame of a mask file 250 includes a filter image 255 corresponding to the image of the gun 215, and a filter image 260 corresponding to the image of the syringe 225, the image of the bag of drugs 230, and the image of the pipe 235. According to an embodiment, the mask file 250 does not include filter images for the sofa 205, the side table 210, and the coffee table 220, because the user profile does not indicate that those objects are considered to be objectionable content. Further, the mask file 250 does not include image data of the frame of the source video. Accordingly, the mask file may be substantially smaller in size (e.g., data size or file size) than the source video file.

According to an embodiment of the present invention, the mask file 250 may be generated based on separate filter files 265 and 270 (e.g., see FIGS. 2D and 2E) for each objectionable content type as identified by the user profile. For example, when the user profile indicates that violence and drug/drug use are the objectionable content types, the mask file 250 may be generated from one or more filter files 265 corresponding to violent content and one or more filter files 270 corresponding to drug/drug use content in the source video. The one or more filter files 265 corresponding to violent content may contain a plurality of frames respectively corresponding to frames of the source video containing violent content, and the one or more filter files 270 corresponding to drug/drug use content may contain a plurality of frames respectively corresponding to frames of the source video containing drug/drug use content.

Accordingly, referring to FIGS. 2D and 2E, a frame of the filter file 265 for violent content corresponding to the frame of the source video may contain the filter image 255 corresponding to the image of the gun 215. Similarly, a frame of the filter file 270 for drug/drug use content corresponding to the frame of the source video may contain the filter image 260 corresponding to the image of the syringe 225, the image of the bag of drugs 230, and the image of the pipe 235.

However, the present invention is not limited thereto, and in some embodiments, a master filter file containing all of the filter images for various objectionable content types may be stored, and filter images for only those objectionable content types corresponding to the obscuring preferences of the user profile may be extracted from the master filter file to generate the mask file.

According to an embodiment of the present invention, a filter image for one objectionable content type may be a different color and/or shape than that of another objectionable content type. For example, the filter image 255 may be a different color from the filter image 260. In this case, the colors of the filter images 255 and 260 in the mask file 250 may be used to identify the different objectionable content types, and thus, may be used to obscure the objectionable content differently based on the objectionable content type. For example, as shown in FIG. 2A, the first mask 212 for obscuring the image of the gun 215 may be different from the second mask 222 for obscuring the image of the drugs and drug paraphernalia 225, 230, and 235. For example, the image of the gun 215 may be pixilated as shown by the first mask 212, and the image of the drugs/paraphernalia 224, 230, and 235 may be covered by a black mask. However, the method of obscuring the objectionable content types as shown in FIG. 2A is only an example, and objectionable content may be obscured in various suitable ways, for example, by pixilation, blurring, visual overlays, computer generated imagery (e.g., adding clothes in nudity content), removing content, skipping content, and/or the like.

According to an embodiment of the present invention, if the filter files are stored as the master filter file in which filter images for the various types of objectionable content are included, the various colors of the filter images may be used to extract the types of content to be obscured for creating the mask file. For example, if the master filter file contains blue filter images representing violent content, red filter images representing drug content, and green filter images representing nudity content, the system may extract only the blue filter images and the red filter images from the master filter file to generate a mask file, when the user profile indicates violent content and drug content as being objectionable, but not nudity content.

Figure 3:
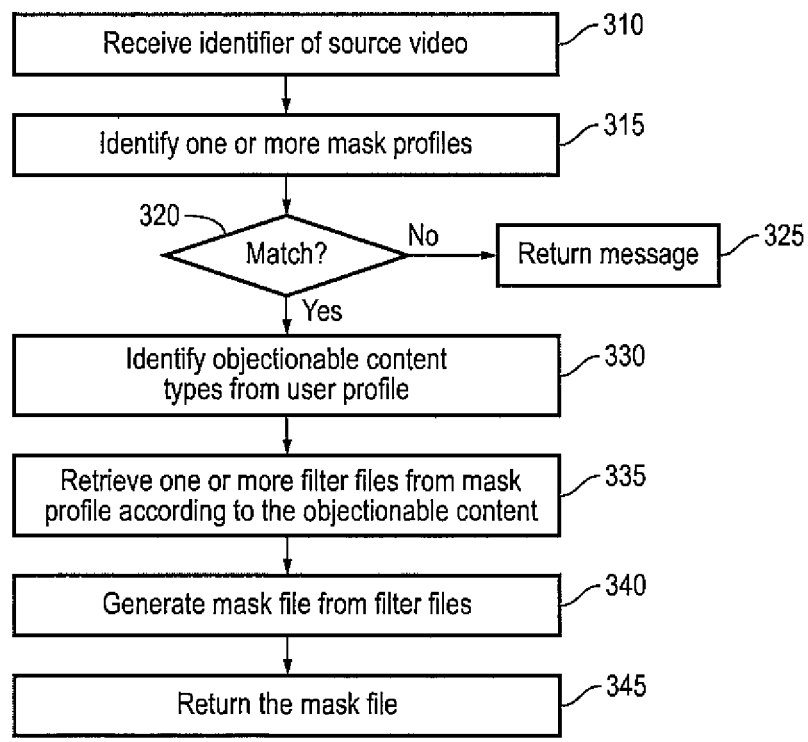
FIG. 3 is a flowchart illustrating a method for retrieving a mask file, according to one or more embodiments of the present invention.

FIG. 3 is a flowchart illustrating a method for retrieving a mask file, according to one or more embodiments of the present invention.

According to one or more embodiments of the present invention, a user selects a source video file to be played via the application 107 on the end user device 105. The source video file may be stored on a local data storage device of the end user device 105, or may be streamed from a Cloud storage device or from a content provider (e.g., from among the content providers 115a-115n of FIG. 1).

Referring to FIG. 3, in response to the selection of the source video file, the application server 120 receives an identifier of the source video file at block 310. For example, when the source video file is streamed from a content provider, the identifier may include a Uniform Resource Locator (URL) of the source video file, but the present invention is not limited thereto.

The video service 130 determines, based on the identifier, whether or not the source video file is known (e.g., has been previously tagged), and thus, whether or not one or more mask profiles have been previously created for the source video file at block 315. For example, the mask profile indicates that the source video file has been tagged and/or marked for one or more types of objectionable content, and may include information for retrieving one or more filter files corresponding to the one or more types of objectionable content.

According to an embodiment, each of the filter files may be, for example, a video file or vector based animation file, and may contain one or more filter images corresponding to an objectionable content type contained in a frame of the source video. For example, a filter file corresponding to nudity may contain one or more filter images for one or more frames of the source video that contains nudity content. When the filter file is a vector based animation file, the vector file may be stored as an XML file, for example, with a series of vertices representing a shape of the object to be obscured, and a new series at different time intervals representing key frames.

If a mask profile does not exist for the source video file at block 320, the user is notified at block 325. For example, the user may be presented a message, such as, "This video file has not yet been reviewed." According to some embodiments, the user may then be presented with an option to watch the source video as-is, and/or to mark objectionable portions of the source video in a tag mode. According to some embodiments, the user may be prompted to enter a security code (or a password) in order to watch the source video as-is.

If a mask profile is identified at block 320, the user service 125 identifies the types of objectionable content to be obscured from the user profile at block 330. For example, the user profile may indicate that nudity and drug use are the types of content that should be obscured. Here, it is assumed that the mask profile for the source video file indicates that the source video has been tagged for nudity, drug use, and violence, and that one or more filter files for each of nudity, drug use, and violence have been generated for the source video file. However, because the user profile in this example does not indicate violence as a type of objectionable content, according to an embodiment of the present invention, the mask service 135 retrieves only the one or more filter files corresponding to nudity and the one or more filter files corresponding to drug use at block 335, but not the one or more filter files corresponding to violence.

At block 340, the mask compositor 140 combines (or merges) the filter files corresponding to nudity and drug use to generate a mask file at block 340. Accordingly, the generated mask file based on the user profile contains filter images corresponding to nudity content and drug use content in the frames of the source video, but does not contain filter images for violent content in the frames of the source video. However, the present invention is not limited thereto, and in some embodiments, the combining of the filter files by the mask compositor 140 may be omitted. In this case, the mask service 135 may provide the various filter files to the application 107 to be used to obscure the objectionable content.

Further, in another embodiment, a master filter file including all of the various types of marked content for the source video may be retrieved by the mask service 135, and only portions of the master filter file corresponding to nudity and drug use may be extracted by the mask compositor 140 to generate the mask file at block 340. For example, the master filter file may contain filter images for nudity, drug use, and violent content, but based on the user profile, only the filter images for nudity and drug use may be extracted from the master filter file by the mask compositor 140 to generate the mask file containing filter images for only nudity and drug use content. In this case, for example, the types of objectionable content may be identified from the master filter file via the filter images. For example, a shape and/or a color of the filter image may be used to identify the type of objectionable content that the filter image represents (e.g., a blue filter image may refer to drug use content).

Once the mask file is generated based on the one or more filter files and the user profile, the mask file is provided to the user device 105 by the mask service 135 or the mask compositor 140 at block 345. Then, as will be described in further detail below with reference to FIG. 4, the masked file is used by the application 107 to obscure the objectionable content of the source video while the user views the source video.

Figure 4:
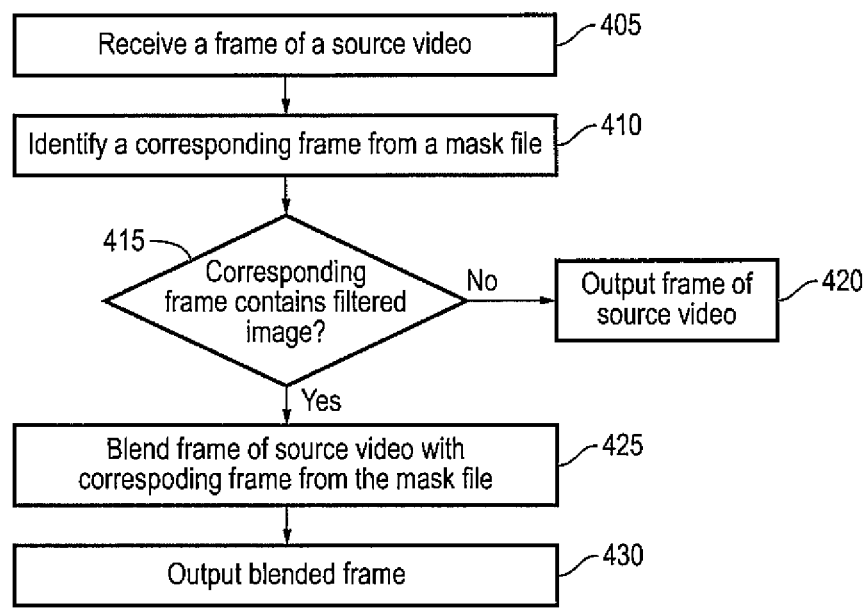
FIG. 4 is a flowchart illustrating a method for obscuring objectionable content when a multimedia file is played on a user device, according to one or more embodiments of the present invention.

FIG. 4 is a flowchart illustrating a method for obscuring objectionable content when a multimedia file is played on a user device, according to one or more embodiments of the present invention.

According to one or more embodiments of the present invention, when a source video is played on a user device via the multimedia player of the application 107, each frame of the source video is analyzed with a corresponding frame from a mask file. For example, if the corresponding frame from the mask file contains a filter image, the filter image is used to obscure a corresponding portion of an image of the frame of the source video.

Referring to FIG. 4, when a user plays the source video on the user device 105, a frame of the source video is received at block 405. A corresponding frame of the mask file is identified at block 410. If the corresponding frame of the mask file does not contain a filter image at block 415, the frame of the source video is output (or displayed) without any portions thereof being obscured at block 420.

However, if the corresponding frame of the mask file contains a filter image at block 415, the frame of the source video may be blended with the corresponding frame of the mask file at block 425. Thus, a portion of the image in the frame of the source video is obscured based on the filter image in the frame of the mask file. Then, the blended frame is output (or displayed) on the user device at block 430.

For example, the frames from the mask file and the source video may be blended based on the following pseudocode, but the present invention is not limited thereto:

```
func displayLinkDidRefresh(_ link: CADisplayLink) {
    if let videoOutput = self.videoOutput, let obscuringOutput =
    self.obscuringOutput,
        !paused {
        if let image = getImage(from:videoOutput), let obscuringImage =
        getImage(from:obscuringOutput) {
            unfilteredImage = image
            let pixelate = CIFilter(name: "CIPixellate", withInputParameters: [
```

-continued

```
                kCIInputImagekey: image,
                kCIInputScaleKey: 50.0,
            ])!
            let mask = CIFilter(name: "CIColorInvert", withInputParameters: [
                kCIInputImagekey: obscuringImage,
            ])!
            let blend = CIFilter(name: "CIBlendWithMask",
            withInputParameters: [
                kCIInputImageKey: pixelate.outputImage!,
                kCIInputBackgroundImageKey: image,
                kCIInputMaskImageKey: mask.outputImage!,
            ])!
            filteredImage = blend.outputImage
            if filtered && filteredImage != nil {
                videoView.image = filteredImage
            } else {
                videoView.image = unfilteredImage
            }
        }
    }
}
```

Accordingly, in the example described above where the user profile indicates that nudity and drug use are the types of content that the user finds objectionable, a portion of the image of the frame of the source video corresponding to nudity and/or drug use may be obscured based on the filtered image in the corresponding frame of the mask file. Here, the filtered image in the mask file may correspond to nudity and/or drug use in the portion of the image in the frame of the source video.

Figure 5A:
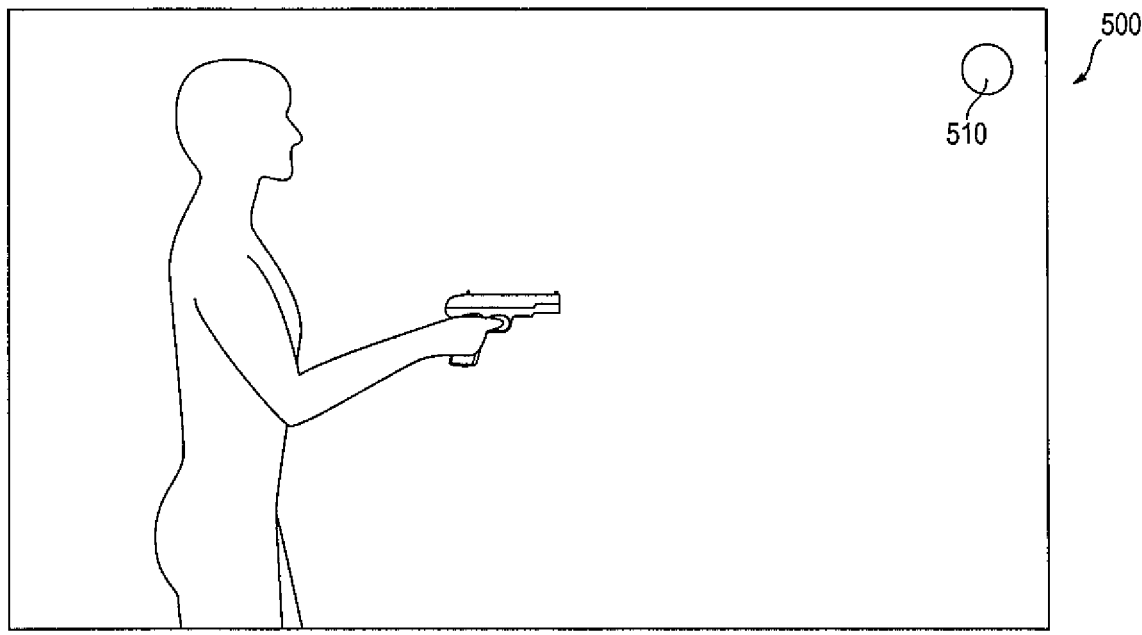
FIGS. 5A-5E illustrate an example of a graphical user interface for marking objectionable content in a source image.
Figure 5B:
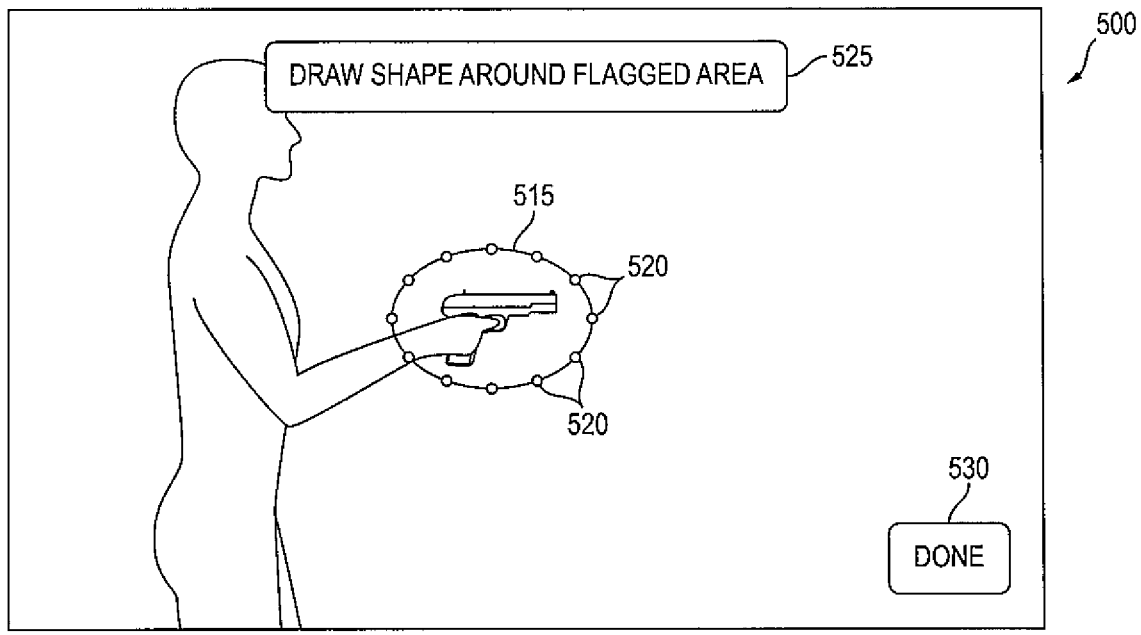
Figure 5C:
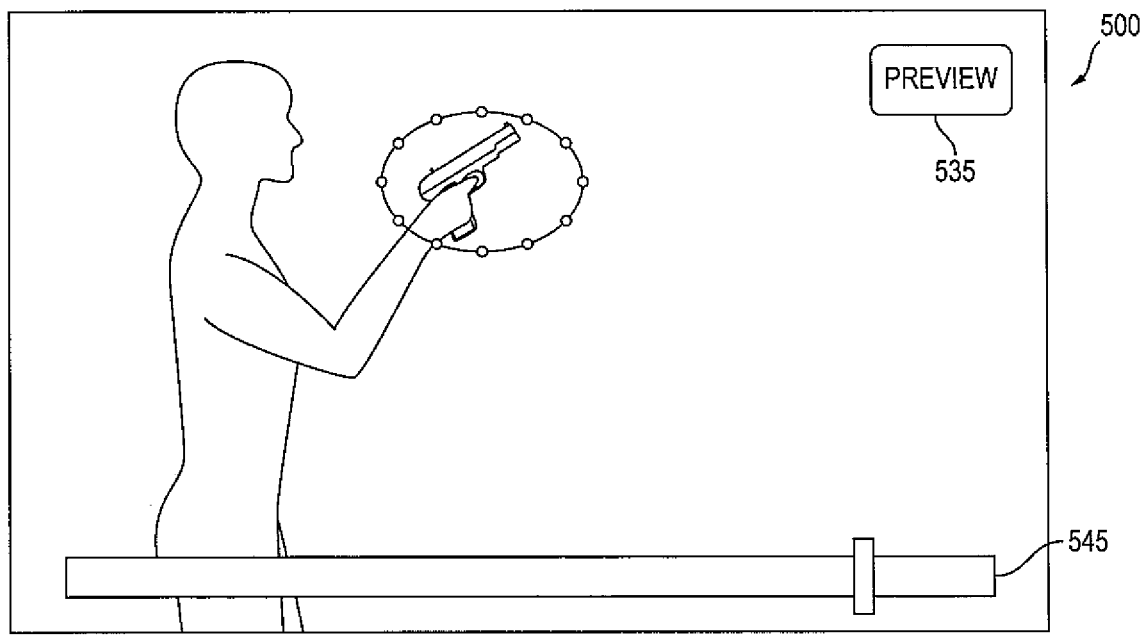
Figure 5D:
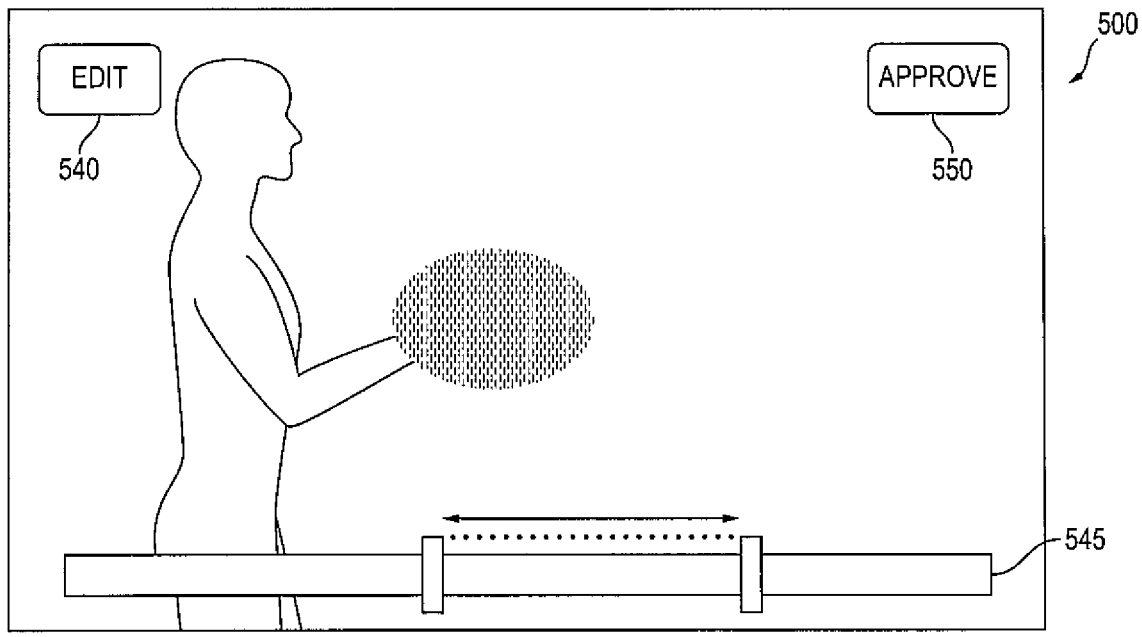
Figure 5E:
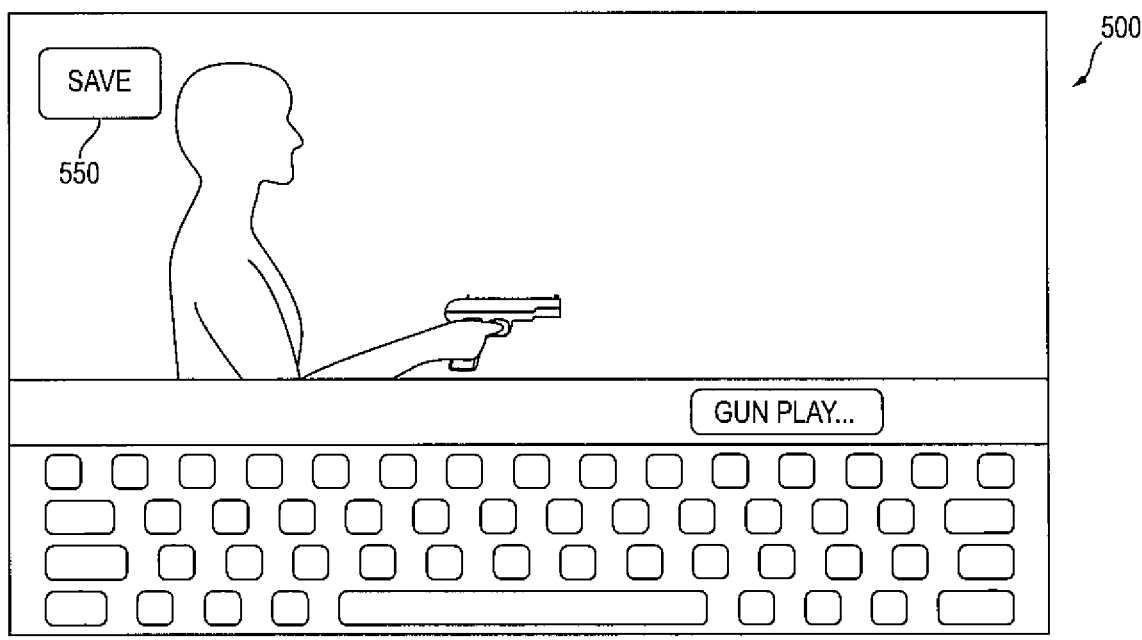
Figure 6:
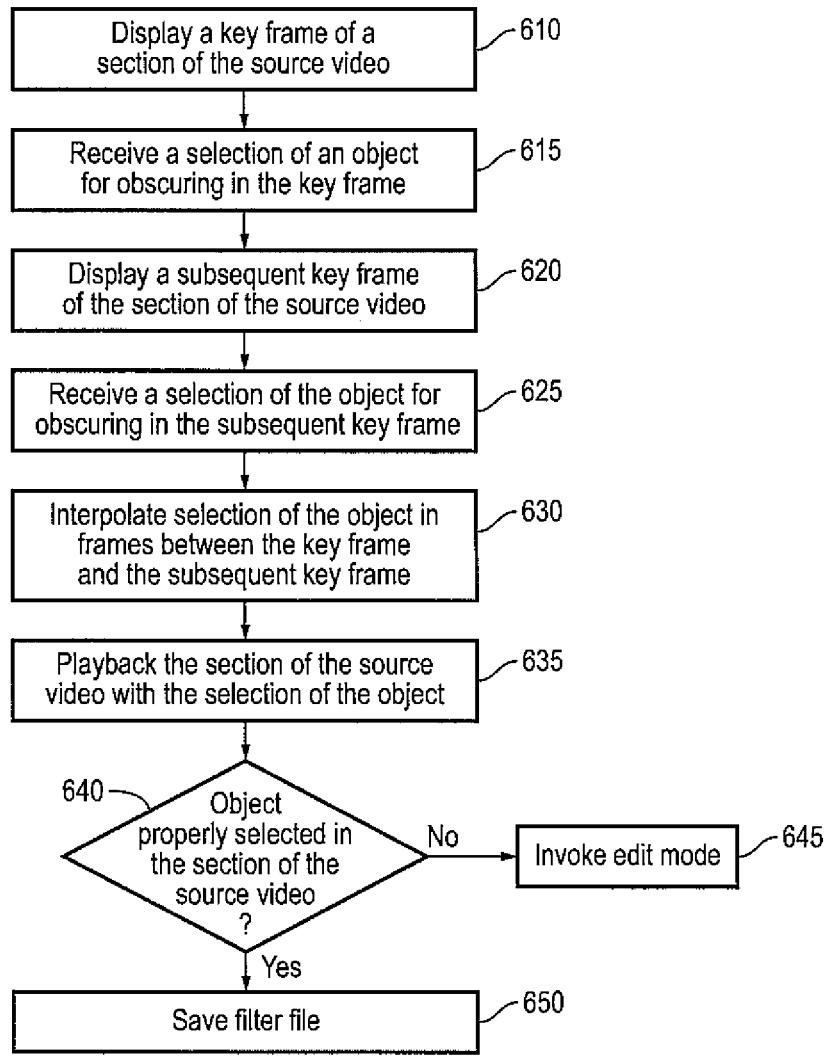
FIG. 6 is a flowchart illustrating a method for marking content in a source video file, according to one or more embodiments of the present invention.

FIGS. 5A through 5E illustrate an example of a graphical user interface for marking objectionable content in a source image, according to one or more embodiments of the present invention, and FIG. 6 is a flowchart illustrating a method for marking content in a source video, according to one or more embodiments of the present invention.

Referring to FIGS. 5A through 5E and FIG. 6, while viewing a source video, a user may tag/mark content within the source video and/or may create a filter file for the source video. For example, the user may notice objectionable content while viewing the source video, and may initiate a tag mode via the application 107 to tag/mark the objectionable content by selecting (e.g., tapping or clicking on) a switch 510 on the media player of the application 107, for example. When the switch 510 is selected, the source video may be paused, and the tag mode may be initiated.

In the tag mode, a key frame of a section of the source video containing the content to be obscured (e.g., an objectionable object or image) may be displayed to the user at block 610. For example, as shown in FIG. 5B, the key frame 500 may be displayed to the user, so that the user can generate a filter image corresponding to one or more objectionable portions within the key frame 500. The user may select the object (or objectionable portion of the image) to be obscured at block 615. The object may be selected by clicking on the object or by drawing (e.g., manually drawing) a border or outline 515 around the object. For example, in some embodiments, the user may click on the object, and in response, the system may utilize object detection and computer vision algorithms to draw a border 515 around the object. In some embodiments, the user may manually draw the border 515 around the object using, for example, a finger, a stylist, a mouse, a selection tool, a remote control, and/or the like.

The user may then edit the border 515 around the object, if desired, by reshaping the border 515. For example, in one embodiment, the user may select one or more points 520 that are automatically generated around the border 515 for convenience, and may reshape the border 515 by manipulating the one or more points 520. For example, the user may drag the points 520 of the border 515 to reshape the border 515 until the object is completely or substantially selected (e.g., the border is completely or substantially around the object to be obscured). However, the present invention is not limited thereto, and in some embodiments, the one or more points 520 may be omitted. In this case, the user may reshape the border 515 by using any suitable method.

In some embodiments, a note 525 may be displayed to provide instructions to the user for marking the objectionable portions of the image. The note 525 may be displayed, for example, for a limited time (e.g., a predetermine limited time) or may be displayed until the user selects the note to be hidden. Further, the note may be displayed upon the first time the user marks content, but may not be displayed during subsequent times the user marks content. However, the present invention is not limited thereto, and the note 525 may be omitted.

After the object is selected in the key frame, the user may select a button 530 (e.g., by tapping or clicking on the button 530). When the user selects button 530, a subsequent key frame of the section of the source video may be displayed to the user at block 620. The user may again select the object to be obscured in the subsequent key frame at block 625, or the object may be pre-selected by the system for user editing according to the selection of the object in the previous key frame and/or according to object detection and computer vision algorithms.

Once the selections of the object in the key frames are completed, the system may then interpolate a border around the object in intermediate frames between the key frames at block 630, and the section of the source video may be played to the user at block 635, for example, by selecting a preview button 535.

If the object is not properly selected throughout the section of the source video at block 640, the user may invoke an edit mode at block 645, for example, by selected button 540. During edit mode, the frames in which the object is not properly selected may be displayed to the user, and the user may edit the border around the object so that the object is properly selected (e.g., the border is around the entire object). In some embodiments, a scrub bar 545 may be displayed to the user, and the user may manually select frames of the source video by scrolling through the scrub bar 545.

If the object is properly selected throughout the section of the source video at block 640, the user may save or approve the selection, and may be prompted to provide a label for the selection. For example, as shown in FIG. 5E, the user may manually enter a label for the marked content via a keyboard. However, the present invention is not limited thereto, and the user may label the marked content by using any suitable methods, for example, via drop down box. After the label is created, the user may select button 550 to save the marked content, and a filter file may be generated and stored by the system according to the label. For example, the tagging admin 145 may associate the filter file with an objectionable content type according to the label, and may store the filter file in a data store (or data storage device) for later retrieval by the mask server 135. In this way, filter files that are generated by one user may be accessed and used by other users of the system. The source video may then continue from the point that the video was paused, and the user may mark other frames, if desired or necessary.

If the user wishes to only tag the content without going through the procedure of marking the content, the processes shown in FIGS. 5A through 5D may be skipped, and the tag may be created by creating a label in a manner that is the same or substantially the same as the process shown in FIG. 5E.

While the method described with reference to FIG. 6 uses key frames to mark the objectionable portions in the source video, the present invention is not limited thereto. For example, in one embodiment, once the tag mode has been initiated, the user may manually scroll through the selection of the video (e.g., frame-by-frame) to mark objectionable portions of the source video.

In one embodiment, the user may be first prompted to create a label (e.g., as shown in FIG. 5E), and the system may utilize computer vision and machine learning to automatically select and create filter images for the object in the frames of the source video corresponding to the label. In this case, the user may preview the sections of the source video containing the objectionable content, and may edit the automatically generated filter images, if desired.

In one embodiment, the user may be provided incentives to identify and/or mark the source video for objectionable content. For example, the system may allocate points and/or may rank the user whenever the user identifies and/or marks objectionable content in a source video. Different points may be allocated for different actions and content types that are marked and/or identified. For example, more points may be allocated for the identification and/or marking of content depicting murder, while fewer points may be allocated to the identification and/or marking of general violence, such as knife/gun play. Further, if the user is the first (or one of an earlier) user to identify particular objectionable content in a source video, more points may be allocated for such actions.

In one embodiment, the user may be provided incentives to verify that filter files or tags for the source video have been properly generated (e.g., by other users of the system). For example, while viewing the source video (e.g., in a quality control mode), various user generated tags may appear in the form of pop-ups, for example, or any other suitable notification methods. The user may then "like" or "dislike" the tags to verify whether or not the objectionable content was properly tagged, identified, and/or marked. If the user notices some content that has not yet been tagged and/or marked, the user may mark the content (e.g., see FIGS. 5A-5E and FIG. 6). The system may then allocate points and/or may rank the user whenever the user "likes" or "dislikes" the tags.

In one embodiment, the user's actions may affect the ranking of other users. For example, "likes" and "dislikes" may by associated to a particular filter file that has been generated by a particular user. The more "likes" that the particular filter file receives, the higher the rank for the particular user. Similarly, the more "dislikes" that the particular filter file receives, the lower the rank for the particular user.

In one embodiment, points may be exchanged for prizes, such as, for example, media content downloads or streams, and/or discounts to media content downloads or streams. According to one embodiment, the user's rank may be recalculated periodically (e.g., every day, week, month, etc.), by being compared to the ranks of other users. For example, the rank may be based off of point totals, which may be compared with point totals for other users. In one embodiment, as the user's rank increases to higher levels, the user's reporting permissions may grow, and may have a higher influence on how the source video is obscured for other users. For example, as the user's reporting permission grow, the filter files created by the user may be immediately available without first having to go through an approval process (e.g., via an administrator's review). In one embodiment, higher ranking users may be given prizes, and the quality of prizes may be based on the level of the ranking.

In one embodiment, the user may verify the number of points and/or rank by checking the user's profile. For example, when the user logs in to his/her user profile, a dashboard may be presented to the user, which may identify the user's point total and/or rank. In one embodiment, the dashboard may also display a history of the user's actions (e.g., marks, tags, likes, dislikes, etc.), which may be used for accounting.

Figure 7:
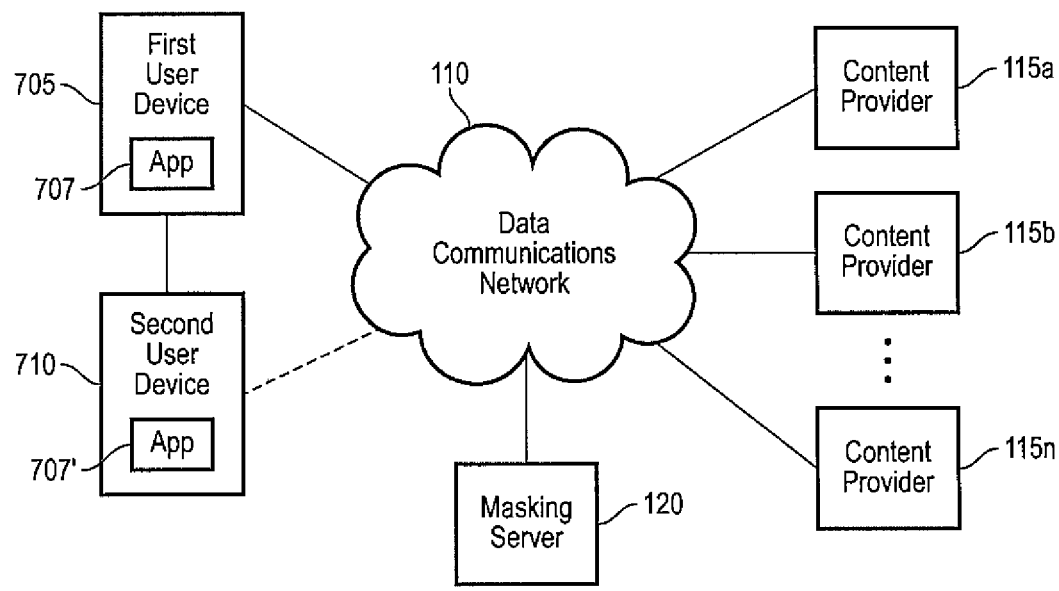
FIG. 7 is a schematic block diagram of a system for identifying and obscuring objectionable content, according to another embodiment of the present invention.
Figure 8:
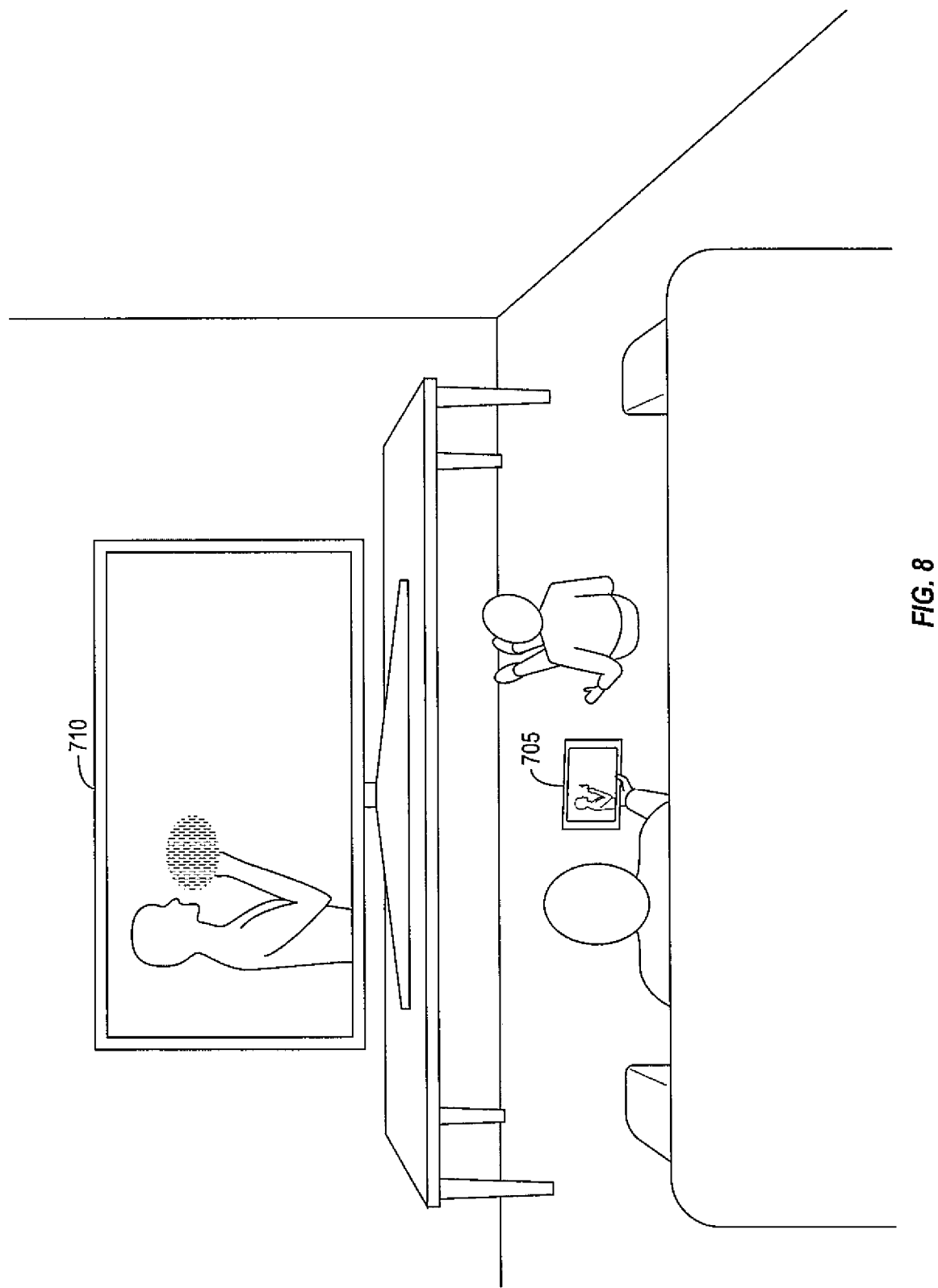
FIG. 8 illustrates an example scenario of utilizing the system shown in FIG. 7.

FIG. 7 is a schematic block diagram of a system for identifying and obscuring objectionable content, according to another embodiment of the present invention. FIG. 8 illustrates an example scenario of utilizing the system shown in FIG. 7.

In FIG. 7, components that are the same or substantially the same as those of FIG. 1 are designated by like reference numbers, and thus, their detailed description may not be repeated.

According to one or more embodiments of the present invention, a user operating a first device (e.g., a primary device) 705 may control the media content that is played on a second device (e.g., a secondary device) 710. Each of the first and second devices 705 and 710 may play the same media content, but the first device 705 may control the obscuring of the objectionable portions of the media content on the second device 710. For example, in one embodiment, screen sharing (e.g., screen mirroring or screen extending) technology may be utilized to share or extend the screen of the first device 705 to the screen of the second device 710. However, the present invention is not limited thereto.

Accordingly, when the user of the first device 705 notices objectionable content that should be obscured, the objectionable content may be tagged/marked on the first device 705, so that the objectionable content may be obscured on the second device 710.

In one embodiment, the first device 705 may play the media content as-is without any objectionable portions thereof being obscured, while the second device 710 plays the media content with the objectionable portions being obscured. Accordingly, the user of the first device 705 may observe an unobstructed version of the media content, while the user of the second device 710 observes the media content with the objectionable portions thereof being obscured. In this case, a notification may be displayed on the first device when a tag or filter image corresponding to a frame of the source video exists. However, the present invention is not limited thereto, and the media content with the objectionable portions thereof being obscured may be observed on both the first and second devices 705 and 710.

In one embodiment, when the user of the first device 705 notices objectionable content that has not been tagged and/or marked (e.g., previously tagged and/or marked), the user may mark the objectionable content to cause the objectionable content to be obscured on the second device. For example, in one embodiment, the user may select a button (e.g., a panic button) from the first device 705 (e.g., a button that is similar to the button 510 in FIG. 5A) to initiate the tag mode on the first device 705. In response to the user initiating the tag mode on the first device 705, the media content on the second device 710 may be paused or muted, and a portion or an entirety of the screen on the second device 710 may be obscured or blocked.

In one embodiment, a delay may be implemented between the media content played on the first device 705 and the media content played on the second device 710. That is, the media content that is played on the second device 710 may be delayed by an interval of time (e.g., a predetermined interval of time). Accordingly, the user of the first device 705 may notice objectionable content before the objectionable content is played on the second device. Thus, the user of the first device 705 may mark and/or tag the objectionable content before the objectionable content is presented on the second device 710.

Referring to FIG. 7, the first user device 705 may have an application 707 installed thereon, and the second user device 710 may have an application 707' installed thereon. The applications 707 and 707' may be the same or substantially the same as the application 107 described above, and/or may each have additional or less functions as those of the application 107 described above.

The first and second user devices 705 and 710 may each be any suitable device including, for example, a television, a projector, a smart phone, a tablet, a laptop, a personal computer, a streaming stick, a streaming device, etc. The streaming stick and/or streaming device may include, for example, Amazon Fire TV, Amazon Fire TV Stick with Alexa Voice Remote, Google Chromecast Audio, Roku Premiere+, Roku Streaming Stick, Google Chromecast, Google Chromecast Ultra, Nvidia Shield TV, Apple TV, and the like.

Each of the applications 707 and 707' may include a media player for playing multimedia content, and at least the application 707 of the first user device 705 may include a graphical user interface (GUI) for marking objectionable portions of the multimedia content to generate filter files, as described above. However, the present invention is not limited thereto, for example, each of the applications 707 and 707' may be available as a software development kit (SDK) that may be embedded in other applications for marking or obscuring content (e.g., objectionable content) in the other applications.

Each of the first and second user devices 705 and 710 may be commutatively connected to a cellular or data communications network 110. For example, the communications network 110 may include a local area network (LAN), private wide area network (WAN), public wide area network, such as the Internet, a wireless carrier network including, for example, a code division multiple access (CDMA) network or a global system for mobile communications (GSM) network, and/or any suitable wireless network/technology conventional in the art, including but not limited to, for example, 3G, 4G, LTE, and the like. However, the present invention is not limited thereto, and at least one of the first and second user devices 705 and 710 may not be connected to the cellular or data communications network 110. For example, as shown in FIG. 7, the second user device 710 may not have cellular or data communications.

The first device 705 may be communicatively connected to the second device 710. For example, the first device 705 may be communicatively connected to the second device 710 via WiFi, WiMAX, Bluetooth, Infrared, Near Field Communication (NFC), local area network (LAN), private wide area network (WAN), public wide area network, such as the Internet, a wireless carrier network including, for example, a code division multiple access (CDMA) network or a global system for mobile communications (GSM) network, and/or any suitable wireless network/technology conventional in the art, including but not limited to, for example, 3G, 4G, LTE, and the like.

The first device 705 may transmit control signals to the second device 710 to control the second device 710. For example, the first device 705 may send a control signal to pause or mute the media player and/or cause a portion or an entirety of the screen of the second device 710 to be obscured or blocked. In one embodiment, the first device 705 may send filter files and/or mask files to the second device 710 to be used to obscure objectionable content on the second device 710.

Each of the applications 707 and 707' may access multimedia content stored in a local data storage device, in Cloud storage, and/or in one or more data stores associated with one or more content providers 115a-115n. Each of the applications 707 and 707' may stream multimedia content from the one or more content providers and/or play multimedia content that is stored locally or in the Cloud. However, the present invention is not limited thereto, and in one embodiment, the application 707' on the second device 710 may only access multimedia content that is stored locally and/or provided by the first device 705. That is, in one embodiment, the first device may serve multimedia content to the second device 710.

The multimedia file may include, for example, a video file, an image file, and/or an audio file. Hereinafter, for convenience of description, it is described that the multimedia file is a video file (e.g., a source video file), but the present invention is not limited thereto.

Each of the applications 707 and 707' may be communicatively connected to a masking server 120. The applications 707 and 707' may request mask files from the masking server 120, and may generate and send filter files to the masking server 120. In one embodiment, the application 707' of the second device 710 may request filter files or mask files from the application 707 of the first device 705. In one embodiment, when the first device 710 generates a filter file, the first device 710 may directly provide the updated filter file to the second device 710, or the second device 710 may request the updated filter file from the masking server 120.

Accordingly, as shown in FIG. 8, in one example embodiment, the user of the first device 705 may control the display of the content on the second device 710. The user of the first device 705 may generate filter files on the first device 705, which may be used by the second device 710 to obscure objectionable content. In one embodiment, the source video may be displayed on the first device 705 as-is, and the source video may be displayed on the second device 710 with objectionable portions thereof being obscured.

FIGS. 9A to 9D are block diagrams of computing devices according to example embodiments of the present invention. FIG. 9E is a block diagram of a network environment including several computing devices according to an example embodiment of the present invention.

In one embodiment, each of the various servers, controllers, switches, gateways, engines, and/or modules (collectively referred to as servers) in the afore-described figures are implemented via hardware or firmware (e.g. ASIC) as will be appreciated by a person of skill in the art.

In one embodiment, each of the various servers, controllers, engines, and/or modules (collectively referred to as servers) in the afore-described figures may be a process or thread, running on one or more processors, in one or more computing devices 1500 (e.g., FIG. 9A, FIG. 9B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The various servers may be located on a computing device on-site at the same physical location as the agents of the contact center or may be located off-site (or in the cloud) in a geographically different location, e.g., in a remote data center, connected to the contact center via a network such as the Internet. In addition, some of the servers may be located in a computing device on-site at the contact center while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the internet using various protocols, such as by exchanging data using encoded in extensible markup language (XML) or JavaScript Object notation (JSON).

Figure 9A:
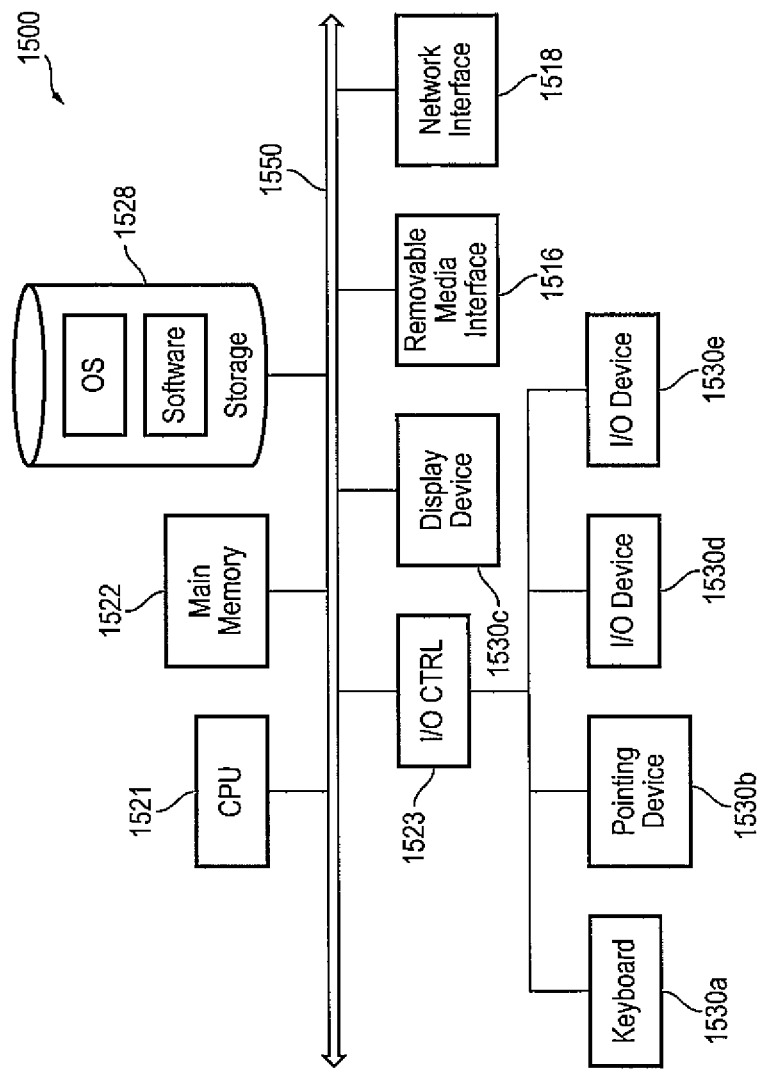
FIG. 9A is a block diagram of a computing device according to an exemplary embodiment of the present invention.
Figure 9B:
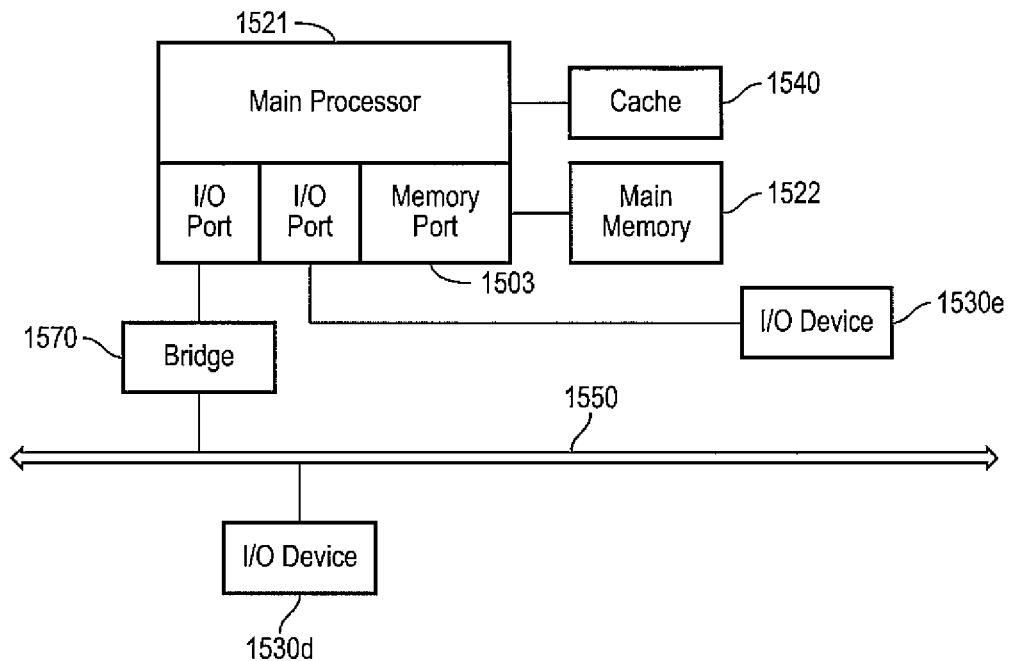
FIG. 9B is a block diagram of a computing device according to an example embodiment of the present invention.

FIG. 9A and FIG. 9B depict block diagrams of a computing device 1500 as may be employed in exemplary embodiments of the present invention. Each computing device 1500 includes a central processing unit 1521 and a main memory unit 1522. As shown in FIG. 9A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 9B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 9A, the central processing unit 1521 communicates with the main memory 1522 via a system bus 1550. As shown in FIG. 9B, the central processing unit 1521 may also communicate directly with the main memory 1522 via a memory port 1503.

FIG. 9B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 9A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 9B depicts an embodiment of a computer 1500 in which the central processing unit 1521 communicates directly with I/O device 1530e. FIG. 9B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 9A, may control the I/O devices. The I/O controller may control one or more I/O devices such as a keyboard 1530a and a pointing device 1530b, e.g., a mouse or optical pen.

Referring again to FIG. 9A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further comprise a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may comprise or be connected to multiple display devices 1530c, which each may be of the same or different type and/or form. As such, any of the I/O devices 1530 and/or the I/O controller 1523 may comprise any type and/or form of suitable hardware, software, or combination of hardware and software to support, enable or provide for the connection to, and use of, multiple display devices 1530c by the computing device 1500. For example, the computing device 1500 may include any type and/or form of video adapter, video card, driver, and/or library to interface, communicate, connector otherwise use the display devices 1530c. In one embodiment, a video adapter may comprise multiple connectors to interface to multiple display devices 1530c. In other embodiments, the computing device 1500 may include multiple video adapters, with each video adapter connected to one or more of the display devices 1530c. In some embodiments, any portion of the operating system of the computing device 1500 may be configured for using multiple display devices 1530c. In other embodiments, one or more of the display devices 1530c may be provided by one or more other computing devices, connected, for example, to the computing device 1500 via a network. These embodiments may include any type of software designed and constructed to use the display device of another computing device as a second display device 1530c for the computing device 1500. One of ordinary skill in the art will recognize and appreciate the various ways and embodiments that a computing device 1500 may be configured to have multiple display devices 1530c.

A computing device 1500 of the sort depicted in FIG. 9A and FIG. 9B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 comprises a combination of devices, such as a mobile phone combined with a digital audio player or portable media player.

Figure 9C:
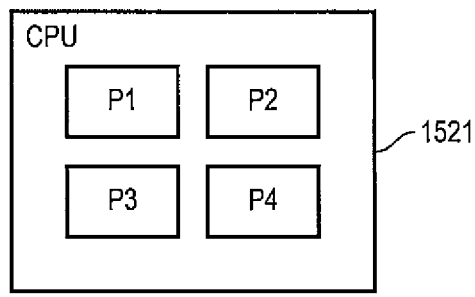
FIG. 9C is a block diagram of a computing device according to an example embodiment of the present invention.
Figure 9D:
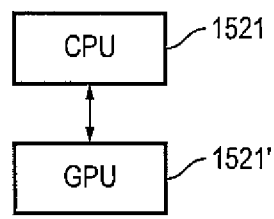
FIG. 9D is a block diagram of a computing device according to an example embodiment of the present invention.
Figure 9E:
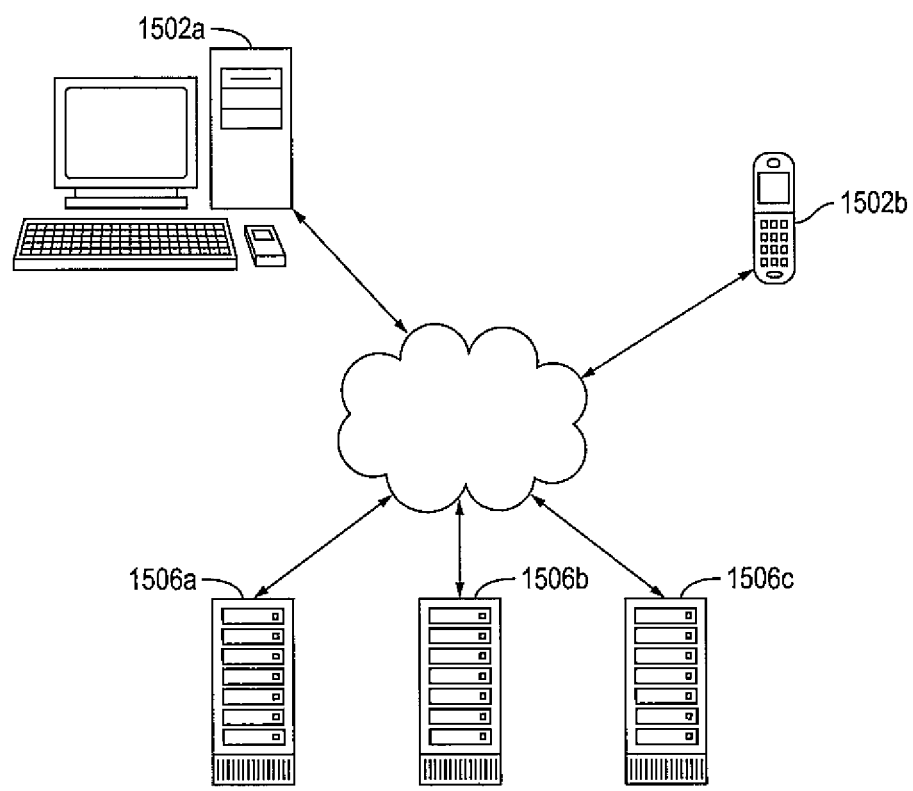
FIG. 9E is a block diagram of a network environment including several computing devices according to an example embodiment of the present invention.

As shown in FIG. 9C, the central processing unit 1521 may comprise multiple processors P1, P2, P3, P4, and may provide functionality for simultaneous execution of instructions or for simultaneous execution of one instruction on more than one piece of data. In some embodiments, the computing device 1500 may comprise a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 comprises a multicore microprocessor, which combines two or more independent processors into a single package, e.g., into a single integrated circuit (IC). In one exemplary embodiment, depicted in FIG. 9D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

A computing device may be one of a plurality of machines connected by a network, or it may comprise a plurality of machines so connected. FIG. 9E shows an exemplary network environment. The network environment comprises one or more local machines 1502a, 1502b (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506a, 1506b, 1506c (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502a, 1502b. Although only two clients 1502 and three server machines 1506 are illustrated in FIG. 9E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may comprise a built-in network adapter, such as a network interface card, suitable for interfacing the computing device 1500 to any type of network capable of communication and performing the operations described herein. An I/O device 1530 may be a bridge between the system bus 1550 and an external communication bus.

According to one embodiment, the network environment of FIG. 9E may be a virtual network environment where the various components of the network are virtualized. For example, the various machines 1502 may be virtual machines implemented as a software-based computer running on a physical machine. The virtual machines may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines may also run on different host physical machines.

Other types of virtualization is also contemplated, such as, for example, the network (e.g. via Software Defined Networking (SDN)). Functions, such as functions of the session border controller and other types of functions, may also be virtualized, such as, for example, via Network Functions Virtualization (NFV).

According to one or more embodiments of the present invention, a user may selectively filter portions of a multimedia file that the user considers to be objectionable. In one embodiment the user may generate filter files containing filter images, and the filter images may correspond to portions of the multimedia file to be obscured. In one embodiment, the filter files may be generated by a plurality of users, and any one of the users may use the filter files to obscure objectionable content.

In one embodiment, the user of a first device may cause objectionable content in a second device to be obscured. In one embodiment, the first device may generate filter files to obscure content on the second device. In one embodiment, the first device may serve content to the second device. In one embodiment, the first device may cause a portion or an entirety of the screen of the second device to be paused and/or obscured, while the user generates filter files on the first device to be used to obscure the content on the second device.

Although the present invention has been described with reference to the example embodiments, those skilled in the art will recognize that various changes and modifications to the described embodiments may be performed, all without departing from the spirit and scope of the present invention. Descriptions of features or aspects within each example embodiment should typically be considered as available for other similar features or aspects in other example embodiments. Furthermore, those skilled in the various arts will recognize that the present invention described herein will suggest solutions to other tasks and adaptations for other applications. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims, and their equivalents.

What is claimed is:

1. A system for obscuring portions of multimedia content, the system comprising:
   a processor; and
   memory coupled to the processor, wherein the memory has stored thereon instructions that, when executed by the processor, causes the processor to:
   identify obscuring preferences from a user profile of a first viewer;
   determine one or more objectionable content types, including content types defined by the first viewer, from the obscuring preferences of the first viewer;
   detect, using a machine learning computer vision algorithm configured to be fine-tuned via human curation, content within a portion of a frame that corresponds to at least one of the objectionable content types as determined by the obscuring preferences of the first viewer profile;

present, to a first user, a first incentive to fine-tune the machine learning computer vision algorithm by identifying content within the portion of the frame that corresponds to at least one of the objectionable content types as determined by the obscuring preferences of the first viewer profile, wherein the first incentive comprises a variable number of points allocated to the first user as a reward based upon the type of content within the portion of the frame being identified by the user that corresponds to at least one of the objectionable content types as determined by the obscuring preferences of the first viewer profile;

generate, based on the detected or user identified content that corresponds to at least one of the objectionable content types as defined by the obscuring preferences of the first user profile, a filter image to obscure the detected or user identified content within the frame;

retrieve one or more filter files corresponding to the objectionable content types, each of the filter files comprising at least one of the generated filter image corresponding to the detected or user identified content within the portion of the frame; and transmit the filter image to obscure the portion of the frame.

2. The system of claim 1, wherein the memory has stored thereon additional instructions that, when executed by the processor, cause the processor to: present, to the first user, the first incentive to fine-tune the machine learning computer vision algorithm by identifying content within the portion of the frame that corresponds to at least one of the objectionable content types as determined by the obscuring preferences of the first viewer profile, wherein the first incentive comprises a variable number of points allocated to the first user as a reward based upon whether the user is the first to identify particular objectionable content as determined by the obscuring preferences of the first viewer profile.

3. The system of claim 2, wherein the memory has stored thereon additional instructions that, when executed by the processor, cause the processor to: present, to the first user, a second incentive to fine-tune the machine learning computer vision algorithm by verifying the correctness of a previous identification or detection of content within the portion of the frame that corresponds to at least one of the objectionable content types as defined by one or more obscuring preferences of a user profile for a second viewer, wherein the second incentive comprises a variable number of points allocated to the first user as a reward based upon whether the user is the first to verify the previous identification or detection within the portion of the frame that corresponds to at least one of the objectionable content types as defined by the one or more obscuring preferences of the user profile for the second viewer.

4. The system of claim 3, wherein the memory has stored thereon additional instructions that, when executed by the processor, cause the processor to: determine one or more objectionable content types, including content types defined by the first viewer and previously undefined within the system, from the obscuring preferences of the first viewer.

5. The system of claim 4, further comprising:
generating a mask file from the one or more filter files, the mask file comprising a plurality of frames corresponding to a plurality of frames of a source video.

6. The system of claim 4, further comprising:
a first user device; and
a second user device communicatively connected to the first user device;
wherein the first user device is configured to generate the filter image, and the second user device is configured to utilize the filter image to obscure the portion of the frame.

7. The system of claim 6, wherein:
the first user device is configured to invoke a tag mode to generate the filter image, and the second user device is configured to obscure a portion of a display of the second user device in response to the invoking of the tag mode on the first user device.

8. The system of claim 7, wherein the first user device is configured to display the frame unobscured, and the second user device is configured to display the frame with the portion of the frame being obscured.

9. The of system of claim 1, wherein the memory stores additional instructions that, when executed by the processor, cause the processor to:
determine one or more objectionable content types, including content types defined by the first viewer and previously undefined within the system, from the obscuring preferences of the first viewer.

10. A method for obscuring portions of multimedia content, comprising:
identifying, by a processor, obscuring preferences from a first viewer profile;
determining, by the processor, one or more objectionable content types, including content types defined by a first viewer, from the obscuring preferences of the first viewer profile;
detecting, using a machine learning computer vision algorithm configured to be fine-tuned via human curation, content within a portion of a frame that corresponds to at least one of the objectionable content types as determined by the obscuring preferences of the first viewer profile;
presenting, to a first user, a first incentive to fine-tune the machine learning computer vision algorithm by identifying content within the portion of the frame that corresponds to at least one of the objectionable content types as determined by the obscuring preferences of the first viewer profile, wherein the first incentive comprises a variable number of points allocated to the first user as a reward based upon the type of content within the portion of the frame being identified by the user that corresponds to at least one of the objectionable content types as determined by the obscuring preferences of the first viewer profile;
generating, by the processor based on the user identified content that corresponds to at least one of the objectionable content types as defined by the obscuring preferences of either the first viewer or the second viewer, a filter image to obscure the user identified content within the frame;
retrieving, by the processor, one or more filter files corresponding to the objectionable content types as defined by the obscuring preferences of either the first viewer or the second viewer, each of the filter files comprising at least one the generated filter image corresponding to the user identified content within the portion of the frame; and
transmitting, by the processor, the filter image to obscure the portion of the frame.

11. The method of claim 10, further comprising:

presenting, to the first user, the first incentive to fine-tune the machine learning computer vision algorithm by identifying content within the portion of the frame that corresponds to at least one of the objectionable content types as determined by the obscuring preferences of the first viewer profile, wherein the first incentive comprises a variable number of points allocated to the first user as a reward based upon whether the user is the first to identify particular objectionable content as determined by the obscuring preferences of the first viewer profile.

12. The method of claim 11, further comprising: presenting, to the first user, a second incentive to fine-tune the machine learning computer vision algorithm by verifying the correctness of a previous identification or detection of content within the portion of the frame that corresponds to at least one of the objectionable content types as defined by one or more obscuring preferences of a user profile for a second viewer, wherein the second incentive comprises a variable number of points allocated to the first user as a reward based upon whether the user is the first to verify the previous identification or detection within the portion of the frame that corresponds to at least one of the objectionable content types as defined by the one or more obscuring preferences of the user profile for the second viewer.

13. The method of claim 12, further comprising: determining, by the processor, one or more objectionable content types, including content types defined by the first viewer and previously undefined within the system, from the obscuring preferences of the first viewer.

14. The method of claim 13, further comprising:

generating, by the processor, a mask file from the one or more filter files, the mask file comprising a plurality of frames corresponding to a plurality of frames of a source video.

15. The method of claim 12, further comprising:

a first user device; and a second user device communicatively connected to the first user device;

wherein the first user device is configured to generate the filter image, and the second user device is configured to utilize the filter image to obscure the portion of the frame.

16. The method of claim 15, wherein:

the first user device is configured to invoke a tag mode to generate the filter image, and the second user device is configured to obscure a portion of a display of the second user device in response to the invoking of the tag mode on the first user device.

17. The method of claim 16, wherein the first user device is configured to display the frame unobscured, and the second user device is configured to display the frame with the portion of the frame being obscured.

18. The method of claim 10, further comprising:

determining, by the processor, one or more objectionable content types, including content types defined by the first viewer and previously undefined within the system, from the obscuring preferences of the first viewer.

* * * * *